(12) United States Patent
Keoshkerian et al.

(10) Patent No.: US 8,403,475 B2
(45) Date of Patent: Mar. 26, 2013

(54) PIGMENT DISPERSION AND CURABLE PHASE CHANGE INKS CONTAINING THE SAME

(75) Inventors: Barkev Keoshkerian, Thornhill (CA); Michelle N. Chretien, Mississauga (CA); Naveen Chopra, Oakville (CA); Daryl W. Vanbesien, Burlington (CA)

(73) Assignee: Xerox Corporation, Norwalk, CT (US)

( * ) Notice: Subject to any disclaimer, the term of this patent is extended or adjusted under 35 U.S.C. 154(b) by 54 days.

(21) Appl. No.: 12/946,560

(22) Filed: Nov. 15, 2010

(65) Prior Publication Data

US 2012/0123040 A1    May 17, 2012

(51) Int. Cl.
*C09D 11/00* (2006.01)
(52) U.S. Cl. ...................................................... 347/100
(58) Field of Classification Search ................... 347/100; 106/31.13
See application file for complete search history.

(56) References Cited

U.S. PATENT DOCUMENTS

| | | |
|---|---|---|
| 7,279,587 B2 | 10/2007 | Odell et al. |
| 7,559,639 B2 | 7/2009 | Belelie et al. |
| 2002/0067394 A1* | 6/2002 | Yoshihiro et al. ............... 347/45 |
| 2008/0218570 A1* | 9/2008 | Kovacs et al. .................... 347/88 |
| 2009/0038506 A1* | 2/2009 | Odell et al. ................ 106/31.13 |

OTHER PUBLICATIONS

Disperbyk-2000 Disperbyk-2001, "High Molecular Weight Wetting and Dispersing Additives for Solvent-Borne Systems", Data Sheet W224, Issue Oct. 2009, 2 pages.
EFKA® 4340, "Your Value Improver for High Performance Pigments", Technical Bulletin, Apr. 2005, 4 pages.
Co-pending U.S. Appl. No. 12/946,527, filed Nov. 15, 2010.
Office Action dated Nov. 26, 2012, issued in Canadian Patent Application No. 2,757,589.

* cited by examiner

*Primary Examiner* — Laura Martin
(74) *Attorney, Agent, or Firm* — Oliff & Berridge, PLC (57) ABSTRACT

A pigment dispersion includes a pigment and a dispersant, wherein an as formed curable phase change ink having the pigment dispersion added thereto, when filtered using a 1 micron filter at a temperature of 85° C., has a slope of $\geq 5$ g/s and a $T_2/T_1$ of $\leq 1.6$, wherein $T_2$ represents a time to filter the last 25 g of a 100 g sample of the phase change ink through the 1 micron filter at 85° C., while $T_1$ represents the time it takes to filter the first 25 g of the 100 g sample of the phase change ink through the 1 micron filter at 85° C.

7 Claims, 4 Drawing Sheets

PIGMENT DISPERSION AND CURABLE PHASE CHANGE INKS CONTAINING THE SAME

BACKGROUND

This disclosure is generally directed to pigment dispersions, particularly pigment dispersions for use in curable phase change inks, curable phase change inks utilizing the pigment dispersions, and a method of evaluating the suitability of a pigment dispersion for use in a curable phase change ink.

Pigment dispersions required for curable phase change inks must meet certain requirements to enable the preparation of filterable and stable inks. These criteria include filtration of the curable phase change inks made using the pigment dispersion through small pore sized filters, and stability at elevated temperatures over extended time periods, for example weeks.

Pigment dispersions that meet the requirements are still desired, particularly dispersions using a dispersant that is able to form pigment dispersions meeting the requirements when used with differently colored pigments, for example when used with cyan, yellow, magenta and black pigments. In this way, an ink set comprised of curable phase change inks for the full color gamut, for example having the colors cyan, yellow, magenta an black, may be prepared in which all of the colored inks of the ink set use an identical pigment dispersion, desirably in the same amount. The advantage of such an ink set is that the colored curable phase change inks of the ink set can be readily mixed without issue to form spot or custom colors. Co-pending application Ser. No. 12/946,527, entitled "Ink Set And Manufacturing Process For Phase Change Inks," and incorporated herein by reference in its entirety, is directed to such curable phase change ink sets.

Prior to the present application, there were very few pigment/dispersant combinations that met the criteria for pigment dispersions to be used in curable phase change inks, and no dispersants used to prepare pigment dispersions for differently colored pigments such that an ink set as described above may be prepared. In particular, cyan pigment dispersions that yield stable and filterable curable phase change inks have not been known.

SUMMARY

It is therefore one of the objects herein to develop pigment dispersions that satisfy the requirements of filtration and stability for use in curable phase change inks. Further objects include development of pigment dispersions using the same dispersant for a number of differently colored pigments so that an ink set of cyan, yellow, magenta and black ink that all include an identical pigment dispersant added thereto may be prepared, and development of methods of evaluating the suitability of the pigment dispersion for use in a curable phase change ink.

These and other objects are satisfied herein.

Described herein is a pigment dispersion comprising a pigment and a dispersant, wherein an as formed curable phase change ink having the pigment dispersion added thereto, when filtered using a 1 micron filter at a temperature of 85° C., has a slope of $\geq 5$ g/s and a $T_2/T_1$ of $\leq 1.6$. A pigment dispersion wherein the curable phase change ink, after aging at 85° C. for 7 days, when filtered using a 1 micron filter at a temperature of 85° C., has a slope of $\geq 5$ g/s and a $T_2/T_1$ of $\leq 1.6$ is also described.

Also described is a curable phase change ink comprised of an ink vehicle having added thereto a pigment dispersion comprising a pigment and a dispersant, wherein the curable phase change ink as formed, when filtered using a 1 micron filter at a temperature of 85° C., has a slope of $\geq 5$ g/s and a $T_2/T_1$ of $\leq 1.6$. Further described is a curable phase change ink, wherein the ink is a cyan, yellow, magenta or black ink, and the ink is used together in an ink set comprised of additional inks such that the ink set includes at least one cyan, at least one yellow, at least one magenta and at least one black ink, and wherein all of the cyan, yellow, magenta and black inks of the ink set include an identical pigment dispersant added thereto.

Still further described is a method of evaluating the suitability of a curable phase change ink for ink jetting, comprising filtering 100 g of the curable phase change ink through a 1 micron filter at a temperature of 85° C., and measuring a slope of amount of the ink passing through the filter (in grams) over time (in seconds) and measuring a ratio of $T_2$ to $T_1$, wherein the curable phase change ink is suitable for ink jetting when the slope is $\geq 5$ g/s and the ratio of $T_2/T_1$ is $\leq 1.6$.

EMBODIMENTS

The pigment dispersions herein comprise a pigment and a dispersant. The pigment dispersions may have a solids percentage of from about 10 to about 50%, such as from about 20 to about 50% or from about 25 to about 40%. Following incorporation into a curable phase change ink, the dispersant may comprise from about 1 to about 30% by weight of the ink, such as from about 5 to about 25% by weight or from about 5 to about 20% by weight of the ink.

As the pigment of the pigment dispersion, any pigment or pigment combination providing a stable pigment dispersion may be employed. The pigment may exhibit any desired color, including a color such as cyan, yellow, magenta, black, red, green, blue and the like. The pigment desirably has a z-average particle size of from about 15 nm to about 300 nm, such as from about 15 nm to about 200 nm. The z-average particle size is measured by methods that use light scattering technology, such as dynamic light scattering.

Examples of suitable pigments include Violet PALIOGEN Violet 5100 (BASF); PALIOGEN Violet 5890 (BASF); HELIOGEN Green L8730 (BASF); LITHOL Scarlet D3700 (BASF); SUNFAST® Blue 15:4 (Sun Chemical 249-0592); Hostaperm Blue B2G-D (Clariant); Permanent Red P-F7RK; Hostaperm Violet BL (Clariant); LITHOL Scarlet 4440 (BASF); Bon Red C (Dominion Color Company); ORACET Pink RF (Ciba); PALIOGEN Red 3871 K (BASF); MICROLITH® Magenta JET 2B (Ciba); SUNFAST® Blue 15:3 (Sun Chemical 249-1284); PALIOGEN Red 3340 (BASF); SUNFAST® Carbazole Violet 23 (Sun Chemical 246-1670); SUNFAST® Violet PV 19 (Sun Chemical); Blue 15:4 (Sun Chemical LITHOL Fast Scarlet L4300 (BASF); Sunbrite Yellow 17 (Sun Chemical 275-0023); HELIOGEN Blue L6900, L7020 (BASF); Sunbrite Yellow 74 (Sun Chemical 272-0558); SPECTRA PAC® C Orange 16 (Sun Chemical 276-3016); HELIOGEN Blue K6902, K6910 (BASF); SUNFAST® Magenta 122 (Sun Chemical 228-0013); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1 355, D1 351 (BASF); HOSTAPERM Pink E 02 (Clariant); Hansa Brilliant Yellow 5GX03 (Clariant); Permanent Yellow GRL 02 (Clariant); Yellow PY139 PM3R (Clariant); Permanent Rubine L6B 05 (Clariant); FANAL Pink D4830 (BASF); CINQUASIA Magenta (DU PONT), PALIOGEN Black L0084 (BASF); Pigment Black K801 (BASF); and carbon blacks such as REGAL 330™ (Cabot), Mogul E (Cabot); Carbon Black 5250, Carbon Black 5750 (Columbia Chemical), mixtures thereof and the like.

In embodiments, the pigment dispersion includes a cyan pigment.

The pigment dispersion may also include some of the monomer and/or oligomer materials of the phase change ink composition. Including some of the monomer and/oligomer components in the phase change dispersion may make the dispersion easier to handle as well as permit the pigment dispersion to be more readily integrated with the phase change ink composition.

Following incorporation into a curable phase change ink, the pigment may be included in the ink in any suitable amount, such as an amount of from about 0.1 to about 25% by weight of the ink, for example from about 0.5 to about 20% or from about 1 or about 15% by weight of the ink.

For the pigment dispersion to be suitable in the formation of a curable phase change ink, the phase change ink following incorporation of the pigment dispersion into the phase change ink must be filterable through a 1 micron filter. This is because the jet nozzles of an ink jet print head through which the phase change ink will be jetted following melting are typically about 50 μm in size. Any ink that does not filter well through a 1 micron filter has the potential to clog up the print head and cause missing jets that will severely impact printer performance.

As used herein, a phase change ink is considered to be suitably filterable through a 1 micron filter where the curable phase change ink as formed is filtered using a 1 micron filter at a temperature of 85° C. and exhibits a slope of $\geq 5$ g/s and a $T_2/T_1$ of $\leq 1.6$. The slope is the slope of a plot of the amount of the ink passing through the 1 micron filter (in grams) over time (in seconds). Desirably, the slope does not level off over time (reflected by $T_2/T_1$ being $\leq 1.6$), which would indicate clogging of the filter, and thus the slope desirably remains $\geq 5$ g/s over filtration of the full sample size evaluated, which is 100 g herein.

$T_2$ represents the time it takes to filter the last 25 g of a 100 g sample of the phase change ink through the 1 micron filter at 85° C., while $T_1$ represents the time it takes to filter the first 25 g of the same 100 g sample of the phase change ink through the 1 micron filter at 85° C. If $T_2/T_1$ is greater than 1.6, such indicates that the ink may begin to clog up the filter, and is an indication that the ink will likely fail in the print head.

Desirably, the curable phase change ink is not only filterable as described above, but also is stable at elevated temperatures because print heads must operate at elevated temperatures in order to jet the phase change ink. For example, print heads may have a temperature of at least about 85° C., and ink in an ink reservoir and/or feeding line of the print head may be exposed to the elevated temperature for long periods of time. To be stable, the phase change ink should exhibit no phase separation at 85° C. Stability may be evaluated by aging the phase change ink by exposing the phase change ink to 85° C. for an extended period of time, 7 days herein, and observing the ink for phase separation.

Desirably, the aged ink performs as well or better than the initially prepared ink. Thus, a pigment dispersion wherein the curable phase change ink, after aging at 85° C. for 7 days, when filtered using a 1 micron filter at a temperature of 85° C., has a slope of $\geq 5$ g/s and a $T_2/T_1$ of $\leq 1.6$, is also realized herein.

In embodiments, the dispersant is an amino acrylate block copolymer. The amino acrylate block copolymer includes an amino and an amino acrylate block A and an acrylate block B, the acrylate portions permitting the dispersant to be stably and well dispersed in the ink vehicle while the amino portions adsorb well to pigment surfaces. Commercially available examples of block copolymer dispersants that have been found suitable for use herein are DISPERBYK-2001 (BYK Chemie GmbH) and EFKA 4340 (Ciba Specialty Chemicals).

The pigment dispersions herein are made by mixing the pigment with the dispersant. The mixing may be conducted by attriting the pigment in the presence of the dispersant, for example using stainless steel balls. The mixing should be done for a sufficient amount of time to permit the dispersant to associate with the surface of the pigment, for example by adsorption of the pigment affinic group of the dispersant onto the pigment surface. For example, in the case of attriting in the presence of stainless steel balls, the mixing may be done for about 5 hours to about 30 hours, such as about 10 hours to about 25 hours. The mixing may also be conducted using media mills or by homogenization. The formed pigment dispersion may then be added to the other components of the phase change ink composition, as discussed below.

The curable phase change ink includes not only the pigment dispersion, but also an ink vehicle. The ink vehicle contains curable components of the ink, and also acts as a carrier for the pigment and dispersant of the ink.

In embodiments, the ink vehicle comprises a curable monomer or oligomer. The ink vehicle may also include a curable wax, a phase change gelling agent and other optional additives such as a photoinitiator.

The term "curable" refers, for example, to a component of the ink vehicle, such as the monomer or oligomer, being polymerizable, that is, a component that may be cured via polymerization, including, for example, free radical routes, and/or in which polymerization is photoinitiated through use of a radiation sensitive photoinitiator.

Thus, for example, the term "radiation curable" is intended to cover all forms of curing upon exposure to a radiation source, including light and heat sources and including in the presence or absence of initiators. Example radiation curing routes include, for example, curing using ultraviolet (UV) light, for example having a wavelength of 200-400 nm, such as in the presence of photoinitiators and/or sensitizers, curing using e-beam radiation, such as in the absence of photoinitiators, curing using thermal curing, in the presence or absence of high temperature thermal initiators (and which are generally largely inactive at the jetting temperature), and appropriate combinations thereof.

Upon exposure to a suitable source of curing energy, for example, ultraviolet light, electron beam energy, or the like, the curable component of the ink and/or a photoinitiator absorbs the energy and sets into motion a reaction that converts the jetted ink composition into a cured material. The curable component of the ink typically includes functional groups that polymerize during exposure to the curing source to readily crosslink, forming a polymer network. This polymer network provides a printed image with, for example, durability, thermal and light stability, and scratch and smear resistance. Thus, the ink composition is particularly well-suited for ink-based images printed on substrates that may be subjected to heat or sunlight, because the composition provides a printed image that is resistant to cracking and fading and provides image permanence.

The ink vehicle may include one or more reactive oligomers, one or more reactive monomers, or a combination of one or more reactive oligomers and one or more reactive monomers. However, in embodiments, the ink vehicle includes at least one reactive (curable) monomer or oligomer, and optionally one or more additional reactive (curable) monomers and/or one or more reactive (curable) oligomers. The curable monomer and/or oligomer of the ink may variously function as a viscosity reducer, as a binder when the composition is cured, as an adhesion promoter, and as a crosslinking agent, for example. Suitable monomers and/or oligomers can have a low molecular weight, low viscosity, and low surface tension and comprise functional groups that undergo polymerization upon exposure to radiation such as UV light in the presence of a suitable initiator. The ink vehicle may be the same or different among inks of an ink set, and thus the curable monomers and/or oligomers may be the same or different among inks of an ink set.

Suitable radiation, such as UV, curable monomers and oligomers include, for example, acrylated esters, acrylated polyesters, acrylated ethers, acrylated polyethers, acrylated epoxies, urethane acrylates, and pentaerythritol tetraacrylate. Specific examples of suitable acrylated monomers include monoacrylates, diacrylates, and polyfunctional alkoxylated or polyalkoxylated acrylic monomers comprising one or more di- or tri-acrylates. Suitable monoacrylates are, for example, cyclohexyl acrylate, 2-ethoxy ethyl acrylate, 2-methoxy ethyl acrylate, 2-(2-ethoxyethoxy)ethyl acrylate, stearyl acrylate, tetrahydrofurfuryl acrylate, octyl acrylate, lauryl acrylate, behenyl acrylate, 2-phenoxy ethyl acrylate, tertiary butyl acrylate, glycidyl acrylate, isodecyl acrylate, benzyl acrylate, hexyl acrylate, isooctyl acrylate, isobornyl acrylate, butanediol monoacrylate, ethoxylated phenol monoacrylate, oxyethylated phenol acrylate, monomethoxy hexanediol acrylate, beta-carboxy ethyl acrylate, dicyclopentyl acrylate, carbonyl acrylate, octyl decyl acrylate, ethoxylated nonylphenol acrylate, hydroxyethyl acrylate, hydroxyethyl methacrylate, and the like. Suitable polyfunctional alkoxylated or polyalkoxylated acrylates are, for example, alkoxylated, such as ethoxylated or propoxylated, variants of the following: neopentyl glycol diacrylates, butanediol diacrylates, trimethylolpropane triacrylates, glyceryl triacrylates, 1,3-butylene glycol diacrylate, 1,4-butanediol diacrylate, diethylene glycol diacrylate, 1,6-hexanediol diacrylate, tetraethylene glycol diacrylate, triethylene glycol diacrylate, tripropylene glycol diacrylate, polybutanediol diacrylate, polyethylene glycol diacrylate, propoxylated neopentyl glycol diacrylate, ethoxylated neopentyl glycol diacrylate, polybutadiene diacrylate, and the like.

A suitable monomer is a propoxylated neopentyl glycol diacrylate, such as, for example, SR9003 (Sartomer Co., Inc., Exton, Pa.). Other suitable reactive monomers are likewise commercially available from, for example, Sartomer Co., Inc., Henkel Corp., Radcure Specialties, and the like. Specific examples of suitable acrylated oligomers include, for example, acrylated polyester oligomers, such as CN2262 (Sartomer Co.), EB 812 (Cytec Surface Specialties), EB 810 (Cytec Surface Specialties), CN2200 (Sartomer Co.), CN2300 (Sartomer Co.), and the like, acrylated urethane oligomers, such as EB270 (UCB Chemicals), EB 5129 (Cytec Surface Specialties), CN2920 (Sartomer Co.), CN3211 (Sartomer Co.), and the like, and acrylated epoxy oligomers, such as EB 600 (Cytec Surface Specialties), EB 3411 (Cytec Surface Specialties), CN2204 (Sartomer Co.), CN110 (Sartomer Co.), and the like; and pentaerythritol tetraacrylate oligomers, such as SR399LV (Sartomer Co.) and the like.

The at least one radiation curable monomer and/or oligomer can be cationically curable, radically curable, or the like.

The curable monomer and/or oligomer is included in the ink in an amount of, for example, about 20 to about 90% by weight of the ink, such as about 30 to about 80% by weight of the ink, or about 50 to about 70% by weight of the ink.

The at least one gelling agent exhibits gel-like behavior that undergoes a relatively sharp increase in viscosity over a relatively narrow temperature range when dissolved in the ink vehicle.

Any suitable gelling agent can be used for the ink vehicle. The gelling agent may be selected from, for example, the gelling agents disclosed in U.S. Pat. No. 7,279,587, incorporated herein by reference in its entirety, such as a compound of the formula wherein:

$R_1$ is:

(i) an alkylene group (wherein an alkylene group is defined as a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group), having from 1 to about 12 carbon atoms, such as from 1 to 4 carbon atoms or 1 to 2 carbon atoms, although the number of carbon atoms can be outside of these ranges, (ii) an arylene group (wherein an arylene group is defined as a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group), having from 5 to about 14 carbon atoms, such as from 5 to 12 carbon atoms or 5 to 10 carbon atoms, although the number of carbon atoms can be outside of these ranges, (iii) an arylalkylene group (wherein an arylalkylene group is defined as a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group), having from 6 to about 32 carbon atoms, such as from 6 to 22 carbon atoms or 7 to 22 carbon atoms, although the number of carbon atoms can be outside of these ranges, or (iv) an alkylarylene group (wherein an alkylarylene group is defined as a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group), having from 6 to about 32 carbon atoms, such as from 6 to 22 carbon atoms or 7 to 22 carbon atoms, although the number of carbon atoms can be outside of these ranges, wherein the substituents on the substituted alkylene, arylene, arylalkylene, and alkylarylene groups can be, for example, halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like, wherein two or more substituents can be joined together to form a ring;

$R_2$ and $R_2'$ each, independently of the other, are selected from the group consisting of:

(i) alkylene groups having from 1 to about 54 carbon atoms, such as from 1 to 36 carbon atoms or 1 to 24 carbon atoms, although the number of carbon atoms can be outside of these ranges, (ii) arylene groups having from 5 to about 14 carbon atoms, such as from 5 to 10 carbon atoms or 6 to 7 carbon atoms, although the number of carbon atoms can be outside of these ranges,

(iii) arylalkylene groups, having from 6 to about 32 carbon atoms, such as from 6 to 22 carbon atoms or 7 to 22 carbon atoms, although the number of carbon atoms can be outside of these ranges, or (iv) alkylarylene groups, having from 6 to about 32 carbon atoms, such as from 6 to 22 carbon atoms or 7 to 22 carbon atoms, although the number of carbon atoms can be outside of these ranges, although the number of carbon atoms can be outside of these ranges, wherein the substituents on the substituted alkylene, arylene, arylalkylene, and alkylarylene groups are the same as the above description for alkylarylene groups;

$R_3$ and $R_3'$ each, independently of the other, are either:

(a) photoinitiating groups, such as groups derived from 1-(4-(2-hydroxyethoxy)phenyl)-2-hydroxy-2-methylpropan-1-one, of the formula groups derived from 1-hydroxycyclohexylphenylketone, of the formula groups derived from 2-hydroxy-2-methyl-1-phenylpropan-1-one, of the formula groups derived from N,N-dimethylethanolamine or N,N-dimethylethylenediamine, of the formula or the like, or:

(b) a group that is:

(i) an alkyl group (including linear and branched, saturated and unsaturated, cyclic and acyclic, and substituted and unsubstituted alkyl groups, and wherein heteroatoms, such as oxygen, nitrogen, sulfur, silicon, phosphorus, boron, and the like either may or may not be present in the alkyl group), having from 2 to 100 carbon atoms, such as from 3 to 60 carbon atoms or 4 to 30 carbon atoms, although the number of carbon atoms can be outside of these ranges, (ii) an aryl group (including substituted and unsubstituted aryl groups, and wherein heteroatoms, such as oxygen, nitrogen, sulfur, silicon, phosphorus, boron, and the like either may or may not be present in the aryl group), having from 5 to about 100 carbon atoms, such as from 6 to 60 carbon atoms or 7 to 30 carbon atoms, although the number of carbon atoms can be outside of these ranges, such as phenyl or the like, (iii) an arylalkyl group (including substituted and unsubstituted arylalkyl groups, wherein the alkyl portion of the arylalkyl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkyl group), having from 6 to about 100 carbon atoms, such as from 7 to 60 carbon atoms or 8 to 30 carbon atoms, although the number of carbon atoms can be outside of these ranges, such as benzyl or the like, or (iv) an alkylaryl group (including substituted and unsubstituted alkylaryl groups, wherein the alkyl portion of the alkylaryl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylaryl group), having from 6 to about 100 carbon atoms, such as from 7 to 60 carbon atoms or 8 to 30 carbon atoms, although the number of carbon atoms can be outside of these ranges, such as tolyl or the like, wherein the substituents on the substituted alkyl, arylalkyl, and alkylaryl groups can be, for example, halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring;

provided that X and X' each, independently of the other, is an oxygen atom or a group of the formula —NR$_4$—, wherein R$_4$ is:

(i) a hydrogen atom;

(ii) an alkyl group, including linear and branched, saturated and unsaturated, cyclic and acyclic, and substituted and unsubstituted alkyl groups, and wherein heteroatoms either may or may not be present in the alkyl group, having from 1 to about 100 carbon atoms, such as from 2 to 60 carbon atoms or 3 to 30 carbon atoms, although the number of carbon atoms can be outside of these ranges,

(iii) an aryl group, including substituted and unsubstituted aryl groups, and wherein heteroatoms either may or may not be present in the aryl group, having from 5 to about 100 carbon atoms, such as from 6 to 60 carbon atoms or 7 to 30 carbon atoms, although the number of carbon atoms can be outside of these ranges, (iv) an arylalkyl group, including substituted and unsubstituted arylalkyl groups, wherein the alkyl portion of the arylalkyl group can be linear or branched, saturated or unsaturated, and cyclic or acyclic, and wherein heteroatoms either may or may not be present in either the aryl or the alkyl portion of the arylalkyl group, having from 6 to about 100 carbon atoms, such as from 7 to 60 carbon atoms or 8 to 30 carbon atoms, although the number of carbon atoms can be outside of these ranges, or (v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, having from 6 to about 100 carbon atoms, such as from 7 to 60 carbon atoms or 8 to 30 carbon atoms, although the number of carbon atoms can be outside of these ranges, wherein the substituents on the substituted alkyl, aryl, arylalkyl, and alkylaryl groups can be, for example, halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring.

In embodiments, the gelling agent of the ink vehicle is an amide gelling agent of the formula:

The ink can include the gelling agent, or gellant, in any suitable amount, such as about 1% to about 30% by weight of the ink, for example in an amount of about 2% to about 20% by weight of the ink, such as about 5% to about 12% by weight of the ink.

The ink vehicle may also include a wax, optionally a curable wax. The curable wax may be any wax component that is miscible with the other components of the ink and that will polymerize with the other curable components of the ink, such as the curable monomer or oligomer. The term "wax" includes, for example, any of the various natural, modified natural, and synthetic materials commonly referred to as waxes. A wax is desirably solid at room temperature, specifically at 25° C. Inclusion of the wax may promote an increase in viscosity of the ink as it cools from the jetting temperature.

Suitable examples of curable waxes include, for example, those waxes that include or are functionalized to include curable groups. The curable groups may include, for example, acrylate, methacrylate, alkene, allylic ether, epoxide, oxetane, and the like. These waxes can be synthesized by the reaction of a wax equipped with a transformable functional group, such as carboxylic acid or hydroxyl.

Suitable examples of hydroxyl-terminated polyethylene waxes that may be functionalized with a curable group include, for example, mixtures of carbon chains with the structure $CH_3$—$(CH_2)_n$—$CH_2OH$, where there is a mixture of chain lengths, n, where the average chain length can be in the range of about 16 to about 50, and linear low molecular weight polyethylene, of similar average chain length. Suitable examples of such waxes include, but are not limited to, the UNILIN® series of materials such as UNILIN® 350, UNILIN® 425, UNILIN® 550 and UNILIN® 700 with Mn (number average molecular weight) of approximately equal to 375, 460, 550 and 700 g/mol, respectively. All of these waxes are commercially available from Baker-Petrolite. A desirable wax herein is an acrylated UNIUN wax.

The wax may be included in the ink composition in an amount of from, for example, about 1% to about 25% by weight of the ink, such as about 2% to about 15% or about 3% to about 10% or about 4% to about 6% by weight of the ink.

The ink vehicle may also include other additives. For example, the ink vehicle may further comprise an initiator, such as a photoinitiator, that initiates polymerization of curable components of the ink, including the curable monomer and the curable wax. The initiator should be soluble in the ink vehicle. The initiator may be a UV-activated photoinitiator.

The initiator can be a radical initiator. Examples of radical photoinitiators include benzophenone derivatives, benzyl ketones, monomeric hydroxyl ketones, α-amino ketones, acyl phosphine oxides, metallocenes, benzoin ethers, benzil ketals, α-hydroxyalkylphenones, α-aminoalkylphenones, acylphosphine photoinitiators sold under the trade designations of IRGACURE® and DAROCUR® from Ciba, isopropyl thioxanthenones, and the like, and mixtures and combinations thereof. Specific examples include 1-hydroxy-cyclohexylphenylketone, benzophenone, benzophenone derivatives, 2-benzyl-2-(dimethylamino)-1-(4-(4-morphorlinyl)phenyl)-1-butanone, 2-methyl-1-(4-methylthio)phenyl-2-(4-morphorlinyl)-1-propanone, diphenyl-(2,4,6-trimethylbenzoyl)phosphine oxide, phenyl bis(2,4,6-trimethylbenzoyl)phosphine oxide, benzyl-dimethylketal, isopropylthioxanthone, 2,4,6-trimethylbenzoyldiphenylphosphine oxide (available as BASF LUCIRIN TPO®), 2,4,6-trimethylbenzoylethoxyphenylphosphine oxide (available as BASF LUCIRIN TPO-L®), bis(2,4,6-trimethylbenzoyl)-phenyl-phosphine oxide (available as Ciba IRGACURE® 819) and other acyl phosphines, 2-methyl-1-(4-methylthio)phenyl-2-(4-morphorlinyl)-1-propanone (available as Ciba IRGACURE® 907) and 1-(4-(2-hydroxyethoxy)phenyl)-2-hydroxy-2-methylpropan-1-one (available as Ciba IRGACURE® 2959), 2-benzyl 2-dimethylamino 1-(4-morpholinophenyl)butanone-1 (available as Ciba IRGACURE® 369), 2-hydroxy-1-(4-(4-(2-hydroxy-2-methylpropionyl)-benzyl)-phenyl)-2-methylpropan-1-one (available as Ciba IRGACURE® 127), 2-dimethylamino-2-(4-methylbenzyl)-1-(4-morpholin-4-ylphenyl)-butanone (available as Ciba IRGACURE® 379), titanocenes, isopropylthioxanthenones, 1-hydroxy-cyclohexylphenylketone, benzophenone, 2,4,6-trimethylbenzophenone, 4-methylbenzophenone, diphenyl-(2,4,6-trimethylbenzoyl)phosphine oxide, 2,4,6-trimethylbenzoylphenylphosphinic acid ethyl ester, oligo(2-hydroxy-2-methyl-1-(4-(1-methylvinyl)phenyl) propanone), 2-hydroxy-2-methyl-1-phenyl-1-propanone, benzyl-dimethylketal, and the like, as well as mixtures thereof. In an embodiment, the ink contains an α-amino ketone, such as, for example, IRGACURE® 379 (Ciba Specialty Chemicals), 2-hydroxy-1-(4-(4-(2-hydroxy-2-methylpropionyl)-benzyl)-phenyl)-2-methylpropan-1-one, such as, for example, IRGACURE® 127 (Ciba Specialty Chemicals), bis(2,4,6-trimethylbenzoyl)-phenylphosphineoxide, such as, for example, IRGACURE® 819 and 2-isopropyl-9H-thioxanthen-9-one, such as, for example, DAROCUR® ITX (Ciba Specialty Chemicals).

The initiator may be a cationic initiator. Examples of suitable cationic photoinitiators include aryldiazonium salts, diaryliodonium salts, triarysulfonium salts, triarylselenonium salts, dialkylphenacylsulfonium salts, triarylsulphoxonium salts and aryloxydiarylsulfonium salts.

The total amount of initiator included in the ink may be, for example, about 0.5 to about 15%, such as about 1 to about 12%, or about 2 to about 10% by weight of the ink.

The ink vehicle may contain additional optional additives. Optional additives may include surfactants, light stabilizers, which absorb incident UV radiation and convert it to heat energy that is ultimately dissipated, antioxidants, optical brighteners, which can improve the appearance of the image and mask yellowing, thixotropic agents, dewetting agents, slip agents, foaming agents, antifoaming agents, flow agents, other non-curable waxes, oils, plasticizers, binders, electrical conductive agents, fungicides, bactericides, organic and/or inorganic filler particles, leveling agents, which are agents that create or reduce different gloss levels, opacifiers, antistatic agents, dispersants, and the like. The inks may include, as a stabilizer, a radical scavenger, such as IRGASTAB UV 10 (Ciba Specialty Chemicals, Inc.). The inks may also include an inhibitor, such as a hydroquinone, to stabilize the composition by prohibiting or, at least, delaying, polymerization of the oligomer and monomer components during storage, thus increasing the shelf life of the composition. However, additives may negatively affect cure rate, and thus care must be taken when formulating a composition using optional additives.

If present, the total amount of other additives included in an ink may be, for example, about 1 to about 15%, such as about 0.2 to about 10%, by weight of the ink.

The curable phase change inks are solid or solid-like at room temperature (around 25° C.). It is desired for the curable phase change inks to have a viscosity of less than about 30 mPas, such as less than about 20 mPas, for example from about 3 to about 30 mPas, from about 5 to about 20 mPas or from about 8 to about 15 mPas, at the temperature of jetting of the ink. Thus, the inks are jetted in a liquid state, which is achieved by applying heat to melt the ink prior to jetting. The inks are desirably jetted at low temperatures, in particular at temperatures below about 120° C., for example from about 50° C. to about 110° C. or from about 60° C. to about 110° C. The inks are thus ideally suited for use in piezoelectric ink jet devices.

When a gelling agent is used in the inks, the temperature at which the ink forms the gel state is any temperature below the jetting temperature of the ink, for example any temperature that is about 5° C. or more below the jetting temperature of the ink. In embodiments, the gel state may be formed at temperatures from about 25° C. to about 100° C., such as from about 40° C. to about 80° C. There is a rapid and large increase in ink viscosity upon cooling from the jetting temperature, at which the ink is in a liquid state, to the gel temperature, at which the ink is in the gel state. The viscosity increase is, for example, about at least a $10^{2.5}$-fold increase in viscosity.

The inks may be prepared by any desired or suitable method. For example, components of the ink may be mixed together, followed by heating the mixture to a temperature near or above the melting point of the ink, for example to a temperature of from about 60° to about 125° C., and stirring until a homogenous ink composition is obtained, followed by cooling the ink to ambient temperature, for example from about 20° C. to about 25° C. As described above, the pigment and dispersant are desirably mixed separate from the other components and added into the ink as a dispersion during the manufacture. The manufacture should be conducted at a temperature below a temperature at which the ink would cure.

In embodiments, the inks herein are used together in an ink set that includes at least two, and desirably three or four, phase change inks of different colors. A colored ink herein is an ink that exhibits a perceptible color to a viewer's naked eye, for example as a result of the ink including a colorant that exhibits the perceptible color. Desirably, a base ink set is comprised of four colored inks representing the CYMK colors. However, a base ink set can also be comprised of different colors, such as, blue, green, red and black. Each ink may utilize a different ink vehicle or may utilize the same ink vehicle. The dispersant of each colored ink of the ink set is desirably the same dispersant.

Using the same pigment dispersant across all colored inks of an ink set can eliminate interactions between the dispersants and/or unintended pigment-dispersant interactions when the inks are mixed in forming a custom color. The colored inks of the ink set are thus readily miscible with each other without precipitation issues, and custom colors of the curable phase change inks can be produced by way of mixing at least two differently colored inks of the ink set. The custom color is desirably formed by melting the respective inks of the ink set and mixing the inks together. A custom color herein is any shade or color different from the known base colors of ink sets, for example the base colors of cyan, yellow, magenta and optionally black and/or red, green, blue and optionally black. The different shade or color of the custom color is achieved by mixing at least two colored inks of the ink set.

The inks described herein may be applied to a substrate to form an image. In order to apply the inks to a substrate, the inks are heated to a temperature that causes the inks to melt. The melted inks may then be jetted through a print head, and then optionally cooled to gel and/or solidify.

In embodiments, the method comprises providing a curable ink described herein; applying the curable ink to the substrate via an ink jet print head to form an image; and exposing the curable ink to curing energy to cure the ink. During the curing process, the curable monomer and the curable wax, optionally with other curable components, are polymerized to form a cured image.

The inks may be employed in an apparatus for direct printing ink jet processes. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Alternatively, the inks can be employed in indirect (offset) printing ink jet applications, wherein when droplets of the melted ink are ejected in an imagewise pattern onto a recording substrate, the recording substrate is an intermediate transfer member and the ink in the imagewise pattern is subsequently transferred from the intermediate transfer member to a final recording substrate.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, glossy coated papers such as XEROX® Digital Color Gloss, Sappi Warren Papers LUSTROGLOSS®, and the like, PASADENA LITHO LABEL® paper, transparency materials, fabrics, textile products, plastics, polymeric films, inorganic substrates such as metals, ceramics, wood, and the like.

Following formation on the substrate, the image on the substrate is exposed to curing energy, for example heat or radiation having an appropriate wavelength, mainly the wavelength at which the ink initiator absorbs radiation, to initiate the curing reaction of the ink. Radiation exposure need not be long, and may be for, for example, about 0.05 to about 10 seconds, more such as about 0.2 to about 5 seconds. These exposure times are more often expressed as substrate speeds of the ink passing under a UV lamp. The radiation to cure the polymerizable components of the ink can, for example, be provided by a variety of possible techniques, including, for example, a xenon lamp, laser light, D or H bulb. The curing light may be filtered, if desired or necessary. The curable components of the ink react to form a cured or crosslinked network of appropriate hardness. In embodiments, the curing is substantially complete when at least 75% of the curable components are cured (polymerized and/or crosslinked), to allow the ink to be substantially hardened, and thereby to be much more scratch resistant, and also to adequately control the amount of showthrough on the substrate.

Examples are set forth hereinbelow and are illustrative of different compositions and conditions that can be utilized in practicing the disclosure. All proportions are by weight unless otherwise indicated. It will be apparent, however, that the disclosure can be practiced with many types of compositions and can have many different uses in accordance with the disclosure above and as pointed out hereinafter.

EXAMPLES

Examples 1-5 and Comparative Examples 1-4

Curable phase change inks including pigment dispersions according to Table 1 were prepared. The pigment dispersions of Table 1 were prepared by adding 1,800 g stainless steel balls, 118 g monomer (SR9003) and 56.25 g EFKA 4340 (polymeric dispersant from Ciba at ~32% solids loading) to an attritor. The components were stirred at 200 rpm, and then 30.75 g of the pigment was added in 3 portions over 5 minutes. This mixture was attrited for 22 hours to afford a 15% solids loading dispersion. The dispersion was isolated by sieving the stainless steel balls to afford 172 g of dispersion.

Each pigment dispersion was then used in forming a curable phase change ink. A preheated (85° C.) solution of UV ink base (200 g, composed of SR9003 monomer, UV photoinitiators, gellator and acrylated wax) was mixed with a homogenizer at 3,000 RPM, to which was added the pigment dispersion (50 g, at room temperature) in 10 seconds and then homogenized for 30 minutes. The ink base was comprised of 7.5% gelling agent (prepared as described in Example VIII of U.S. Pat. No. 7,279,587), 5% UNILIN 350-acrylate (prepared as described in U.S. Pat. No. 7,559,639, incorporated herein by reference), 54.8% SR9003, 5% SR399LV, 3% IRGACURE 379, 1% IRGACURE 819, 3.5% IRGACURE 127, and 0.2% IRGASTAB UV10.

100 g of each ink composition was then subjected to filtration through a 1 micron filter. The slope of grams filtered to time, as well as $T_2$ and $T_1$, was evaluated for each ink Each ink was also subjected to aging at 85° C. for 7 days to form an aged ink, and each aged ink was subjected to the same filtration test as above. The results are shown in Table 1.

TABLE 1

| Example | Pigment | Slope | $T_2/T_1$ | Slope (aged) | $T_2/T_1$ (aged) |
|---|---|---|---|---|---|
| Comparative 1 | Toda Kogyo Cyan | 0.9 | 1.98 | NA | NA |
| Example 1 | Sun SPECTRAPAC C | 10.6 | 0.92 | 10.9 | 0.99 |
| Comparative 2 | Sun SUNBRITE Yellow 14 | 0.17 | 0 | NA | NA |
| Example 2 | Clariant Yellow PY139 PM3R | 12.2 | 0.86 | 9.7 | 1.2 |
| Comparative 3 | Toda Kogyo Magenta | 3.1 | 1.44 | 2.23 | 1.08 |
| Example 3 | BASF MICROLITH JET 2B | 8.42 | 1.45 | 7.2 | 1.1 |
| Example 4 | SUN Violet PV19 (228-6741) | 10.09 | 1.01 | 8.94 | 1.01 |
| Example 5 | Cabot MOGUL E | 9.75 | 1.15 | 8.28 | 1.05 |
| Comparative 4 | Degussa PRINTEX 80 | 3.62 | 1.42 | 0.19 | 0 |

Figure 1:
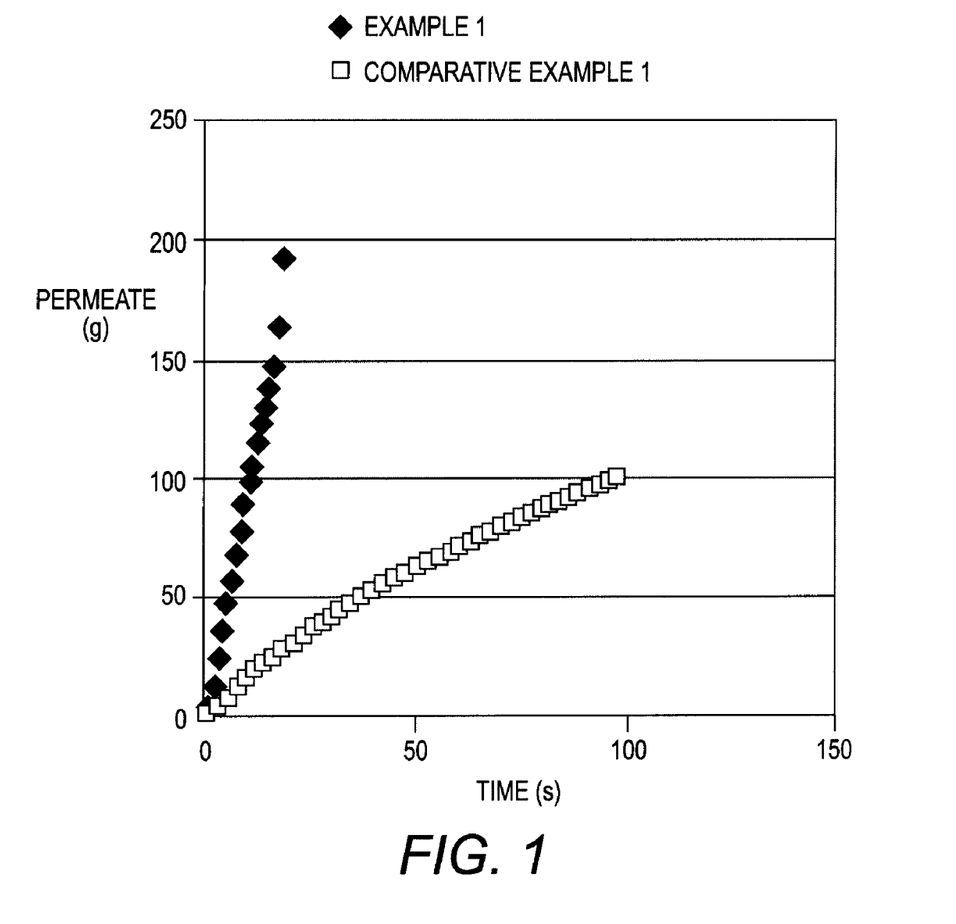
FIG. 1 is a chart of the filtration properties of curable phase change inks containing a first dispersion of an amino acrylate block copolymer dispersant with different cyan pigments.
Figure 2:
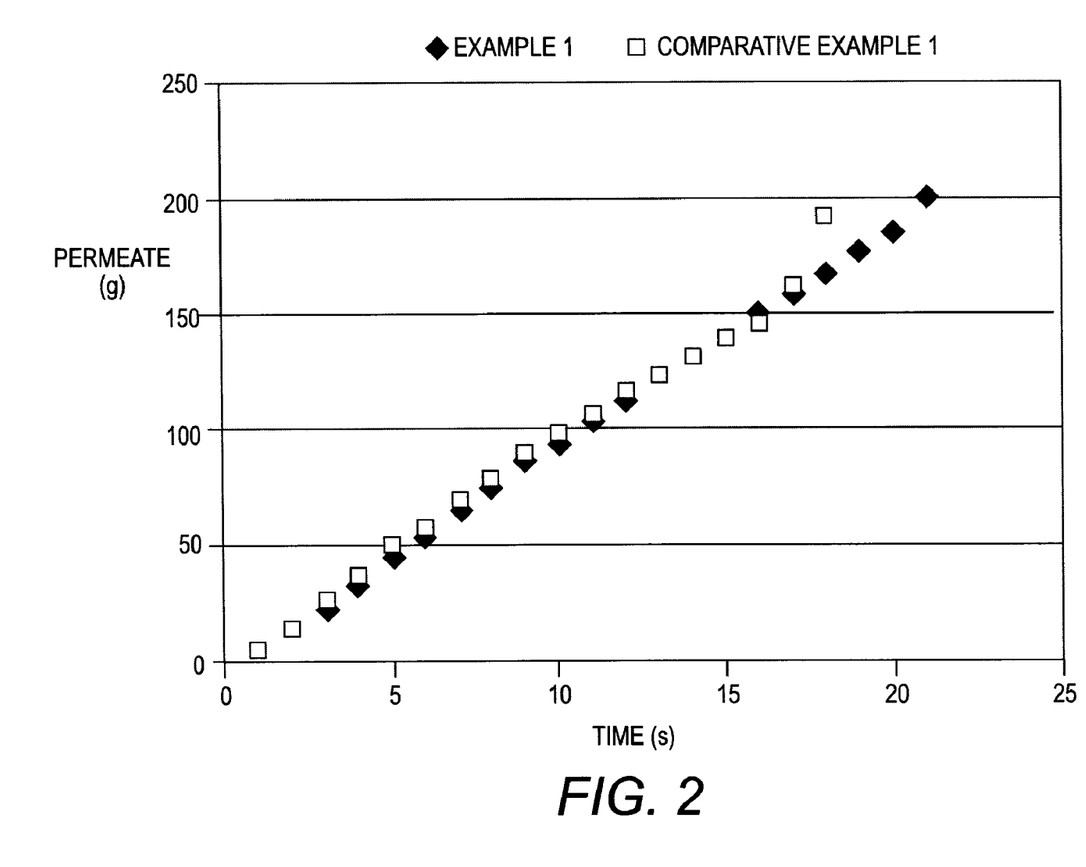
FIG. 2 is a chart of the filtration properties of a curable phase change ink containing a first dispersion of an amino acrylate block copolymer dispersant with a pigment as made compared to as aged after 7 days at 85° C.

FIG. 1 demonstrates the ink filtration results of the non-aged inks of Example 1 and Comparative Example 1. The filtration results for Comparative Example 1 indicate that the pigment dispersion is not suitable due to a poor slope, likely the result of clogging of the filter by the comparative ink. FIG. 2 demonstrates the ink filtration results of the non-aged ink of Example 1 and the aged ink of Example 1, and illustrates that the ink filtration properties did not change to any significant degree following aging.

Examples 6-9

Curable phase change inks including pigment dispersions according to Table 2 were prepared. The pigment dispersions of Table 2 were prepared by adding 1,800 g stainless steel balls, 118 g monomer (SR9003) and 48.2 g DISPERBYK 2001 (polymeric dispersant from Byk at ~38.3% solids loading) to an attritor. The components were stirred at 200 rpm, and then 30.75 g of the pigment was added in 3 portions over 5 minutes. This mixture was attrited for 22 hours to afford a 15% solids loading dispersion. The dispersion was isolated by sieving the stainless steel balls to afford 178.2 g of dispersion.

Each pigment dispersion was then used in forming a curable phase change ink. A preheated (85° C.) solution of UV ink base (200 g, composed of SR9003 monomer, UV photoinitiators, gellator and acrylated wax) was mixed with a homogenizer at 3,000 RPM, to which was added the pigment dispersion (50 g, at room temperature) in 10 seconds and then homogenized for 30 minutes. The ink base was the same as Examples 1-5 above.

100 g of each ink composition was then subjected to filtration through a 1 micron filter. The slope of grams filtered to time, as well as $T_2$ and $T_1$, was evaluated for each ink. Each ink was also subjected to aging at 85° C. for 7 days to form an aged ink, and each aged ink was subjected to the same filtration test as above. The results are shown in Table 2.

TABLE 2

| Example | Pigment | Slope | $T_2/T_1$ | Slope (aged) | $T_2/T_1$ (aged) |
|---|---|---|---|---|---|
| Example 6 | Sun SPECTRAPAC C | 9.05 | 0.73 | 9.54 | 1.08 |
| Example 7 | Clariant Yellow PY139 PM3R | 8.71 | 1.37 | 5.51 | 1.42 |
| Example 8 | BASF MICROLITH JET 2B | 5.09 | 1.37 | 5.0 | 1.21 |
| Example 9 | Cabot MOGUL E | 7.18 | 1.6 | 8.46 | 1.1 |

Figure 3:
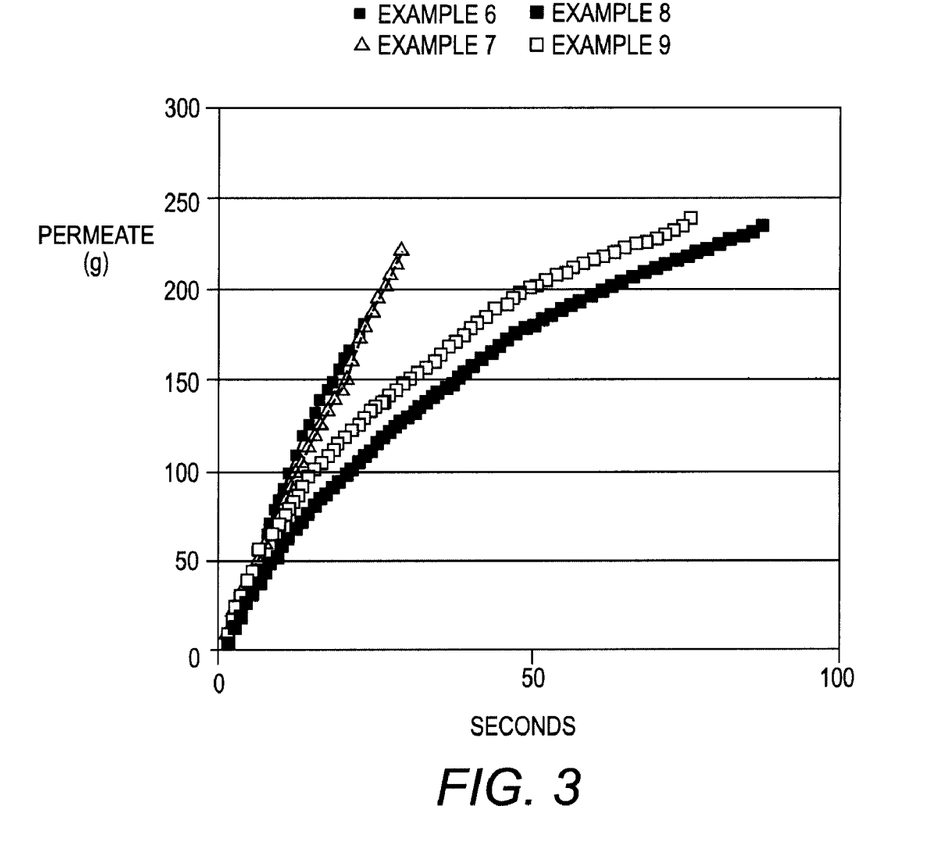
FIG. 3 is a chart of the filtration properties of curable phase change inks containing a second dispersion of an amino acrylate block copolymer dispersant with different pigments.
Figure 4:
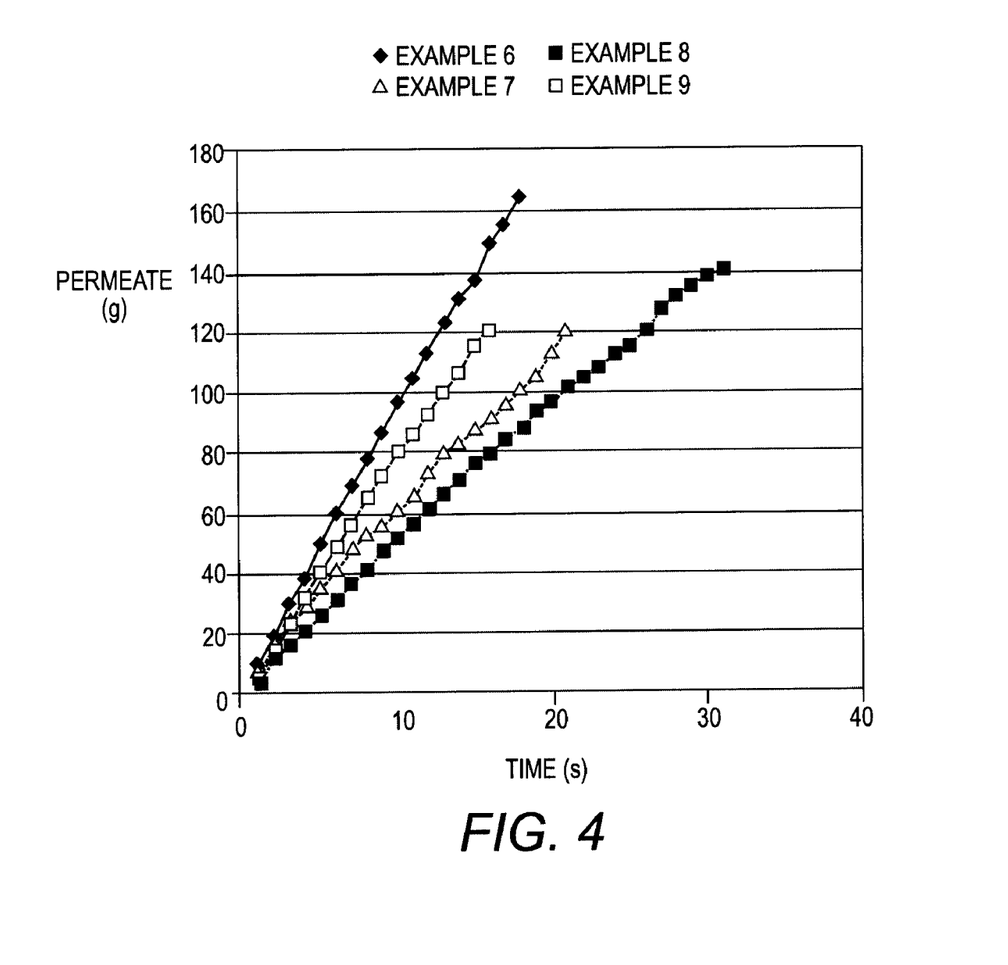
FIG. 4 is a chart of the filtration properties of curable phase change inks containing a second dispersion of an amino acrylate block copolymer dispersant with different pigments after aging for 7 days at 85° C.

FIG. 3 demonstrates the ink filtration results of the non-aged inks of Examples 6-9. FIG. 4 demonstrates the ink filtration results of the aged inks of Examples 6, 8 and 9.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A curable phase change ink comprised of an ink vehicle having added thereto a pigment dispersion comprising a pigment and a dispersant, wherein the curable phase change ink as formed, when filtered using a 1 micron filter at a temperature of 85° C., has a slope of $\geq 5$ g/s and a $T_2/T_1$ of $\leq 1.6$, wherein $T_2$ represents a time to filter the last 25 g of a 100 g sample of the phase change ink through the 1 micron filter at 85° C., while $T_1$ represents the time it takes to filter the first 25 g of the 100 g sample of the phase change ink through the 1 micron filter at 85° C., wherein the curable phase change ink is a cyan, yellow, magenta or black ink, and wherein the curable phase change ink is used together in an ink set comprised of additional inks such that the ink set includes at least one cyan, at least one yellow, at least one magenta and at least one black ink, wherein all of the cyan, yellow, magenta and black inks of the ink set include an identical dispersant, and wherein the dispersant is an amino acrylate block copolymer.

2. The curable phase change ink according to claim 1, wherein the ink vehicle of the curable phase change ink is comprised of about 20% weight to about 90% weight of the curable phase change ink of a curable monomer or oligomer, about 1% weight to about 30% weight of the curable phase change ink of a gelling agent and about 1% weight to about 25% weight of the curable phase change ink of a wax.

3. The curable phase change ink according to claim 1, wherein the curable phase change ink is solid at room temperature and has a viscosity of from about 3 to about 30 mPas at a jetting temperature of the curable phase change ink.

4. The curable phase change ink according to claim 1, wherein the curable phase change ink further comprises a photoinitiator, and wherein the curable phase change ink is curable by ultraviolet radiation.

5. The curable phase change ink according to claim 1, wherein the pigment of the pigment dispersion has a z-average particle size of from about 15 nm to about 300 nm.

6. The curable phase change ink according to claim 1, wherein the amino acrylate block copolymer comprises a block comprising an amine or an amine acrylate and a block comprising an acrylate.

7. The curable phase change ink according to claim 1, wherein the curable phase change ink, after aging at 85° C. for 7 days, when filtered using a 1 micron filter at a temperature of 85° C., has a slope of $\geq 5$ g/s and a $T_2/T_1$ of $\leq 1.6$.

* * * * *